United States Patent
Shah et al.

(10) Patent No.: US 6,784,585 B2
(45) Date of Patent: Aug. 31, 2004

(54) HYBRID SALIENT POLE MACHINES

(75) Inventors: Manoj Ramprasad Shah, Latham, NY (US); Gerald Burt Kliman, Niskayuna, NY (US); Madabushi Venkata Krishnama Chari, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/298,685

(22) Filed: Nov. 18, 2002

(65) Prior Publication Data

US 2003/0102759 A1 Jun. 5, 2003

Related U.S. Application Data

(62) Division of application No. 09/482,660, filed on Jan. 13, 2000, now Pat. No. 6,509,664.

(51) Int. Cl.[7] .................. H02K 21/04; H02K 19/12; H02K 1/27
(52) U.S. Cl. ............... 310/181; 310/156.28; 310/85
(58) Field of Search ................... 310/181, 191, 310/209, 156.57, 156.28, 85

(56) References Cited

U.S. PATENT DOCUMENTS

| | | | |
|---|---|---|---|
| 2,626,367 A | 1/1953 | Beymer | 310/156 |
| 3,201,625 A * | 8/1965 | Smith et al. | 310/181 |
| 3,555,327 A | 1/1971 | Terry | 310/168 |
| 4,595,871 A | 6/1986 | Koehler | 318/696 |
| 4,625,135 A * | 11/1986 | Kasabian | 310/156.28 |
| 4,631,435 A | 12/1986 | McCarty | 310/156 |
| 4,748,359 A * | 5/1988 | Yahara et al. | 310/156 |
| 4,882,515 A | 11/1989 | Radomski | 310/263 |
| 4,959,577 A | 9/1990 | Radomski | 310/263 |
| 4,978,878 A | 12/1990 | Dijken | 310/268 |
| 4,980,595 A | 12/1990 | Arora | 310/263 |
| 5,047,680 A | 9/1991 | Torok | 310/156 |
| 5,130,595 A | 7/1992 | Arora | 310/268 |
| 5,132,581 A | 7/1992 | Kusase | 310/263 |
| 5,159,220 A | 10/1992 | Kliman | 310/156 |
| 5,177,391 A | 1/1993 | Kusase | 310/263 |
| 5,191,256 A | 3/1993 | Reiter, Jr. et al. | 310/156 |
| 5,304,882 A | 4/1994 | Lipo et al. | 310/156 |
| 5,327,069 A | 7/1994 | Radun et al. | 322/10 |
| 5,397,975 A | 3/1995 | Syverson | 322/46 |
| 5,502,368 A | 3/1996 | Syverson et al. | 322/28 |
| 5,661,350 A | 8/1997 | Lucidarme et al. | 310/12 |
| 5,663,605 A | 9/1997 | Evans et al. | 310/181 |
| 6,005,318 A * | 12/1999 | Pop, Sr. | 310/156.57 |
| 6,037,691 A | 3/2000 | Akemakou | 310/191 |
| 6,509,664 B2 * | 1/2003 | Shah et al. | 310/181 |

FOREIGN PATENT DOCUMENTS

| | | | | |
|---|---|---|---|---|
| DE | 61-116954 | * | 6/1986 | H02K/19/28 |
| DE | 195 27 324 | * | 1/1997 | H02K/21/04 |
| EP | 167158 | * | 1/1986 | H02K/21/04 |
| EP | 723 330 | * | 7/1996 | H02K/21/04 |
| JP | 57-059459 A | | 4/1982 | 310/261 |
| JP | 63-154034 | * | 6/1988 | H02K/1/24 |
| JP | 8-070541 A | | 3/1996 | 310/156 |
| JP | 08-116634 A | | 5/1996 | 310/156 |
| JP | 2003-47225 | * | 2/2003 | H02K/1/27 |

* cited by examiner

*Primary Examiner*—Karl Tamai
(74) *Attorney, Agent, or Firm*—Ann M. Agosti; Patrick K. Patnode

(57) ABSTRACT

A hybrid synchronous machine includes a cylindrical element having slots; excitation windings situated in at least some of the slots; and permanent magnets situated in at least some of the slots. For a hybrid salient pole machine 16 a cylindrical element has salient poles with excitation windings situated around the salient poles and permanent magnets supported by the salient poles.

2 Claims, 8 Drawing Sheets ns of rotors for hybrid syn-
HYBRID SALIENT POLE MACHINES

This application is a division of application Ser. No. 09/482,660, filed Jan. 13, 2000 now U.S. Pat. No. 6,509,664 which is hereby incorporated by reference in its entirety.

BACKGROUND

The invention relates generally to synchronous machines having round or salient pole rotors.

Most synchronous machines are designed to include either permanent magnets or excitation windings (fed by a regulated source) to provide MMF (magnetomotive force) that provides the magnetic flux for machine operation. The permanent magnets or excitation windings can be situated on either the rotor or the stator. For rotor-based embodiments, excitation power is brought through either a set of collectors (slip rings) or a brushless system that uses a small ("inside-out") synchronous machine with a stator excitation source.

Permanent magnet machines are not easily regulated. Operation of permanent magnet machines in constant power mode can be a problem because low power factor operation is forced through flux weakening methods to reduce voltage at light loads or to minimize inverter ratings. As a result, the machine terminal voltage becomes load dependent, efficiency suffers, and, at partial loads, the magnetic field source is underutilized.

Machines wound with excitation windings ("wound field machines") can be regulated over a wide range of loads, but wound field machines experience winding losses that decrease machine efficiency. Additionally, windings and excitation sources for wound field machines are sized to support the maximum requirements and thus are often expensive and under-utilized.

Evans et al., U.S. Pat. No. 5,663,605 describes a salient pole alternator for automotive applications including a rotor having both wound-field and permanent magnet poles disposed about the circumference of the rotor. The magnets are situated inside salient poles, and the windings are situated around different salient poles from the magnet poles. Automotive alternators operate at low magnetic and mechanical stress levels and often include complex and fragile multiple pole configurations. For applications requiring higher power machines, such as boiler feed pumps and utility generators, for example, more practical configurations would be desirable.

BRIEF SUMMARY

It would therefore be desirable to have a durable machine that further combines the advantages of the excitation control of wound field machines and the advantages of higher efficiency of permanent magnet machines.

Briefly, according to one embodiment of the present invention, a hybrid machine comprises a cylindrical element having slots; excitation windings situated in at least some of the slots; and permanent magnets situated in at least some of the slots.

According to another embodiment of the present invention, a hybrid machine comprises a cylindrical element having salient poles; excitation windings situated around the salient poles; and permanent magnets supported by the salient poles.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTIONS

Figure 1:
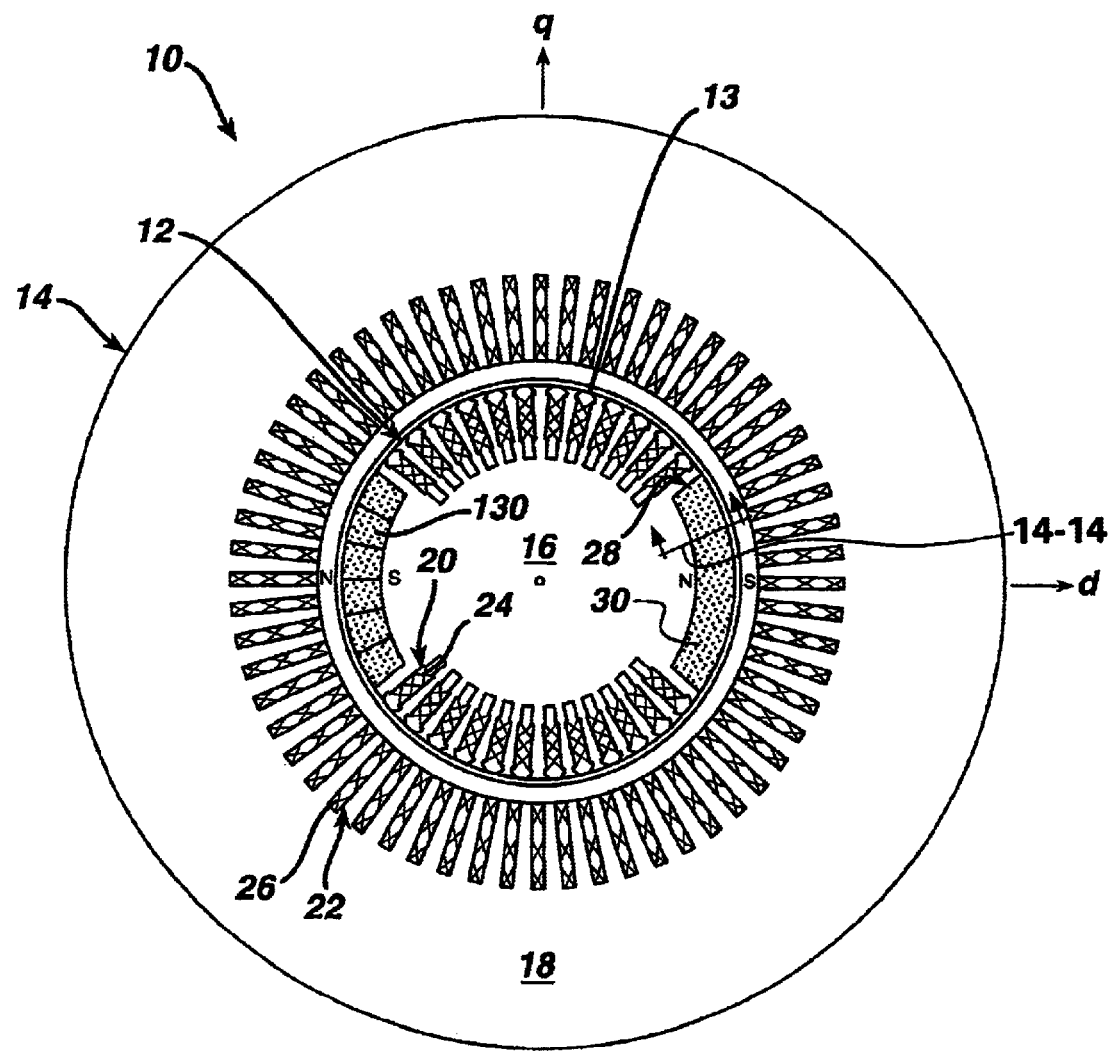
FIG. 1 is a sectional view of a hybrid synchronous machine according to one embodiment of the present invention.
Figure 2:
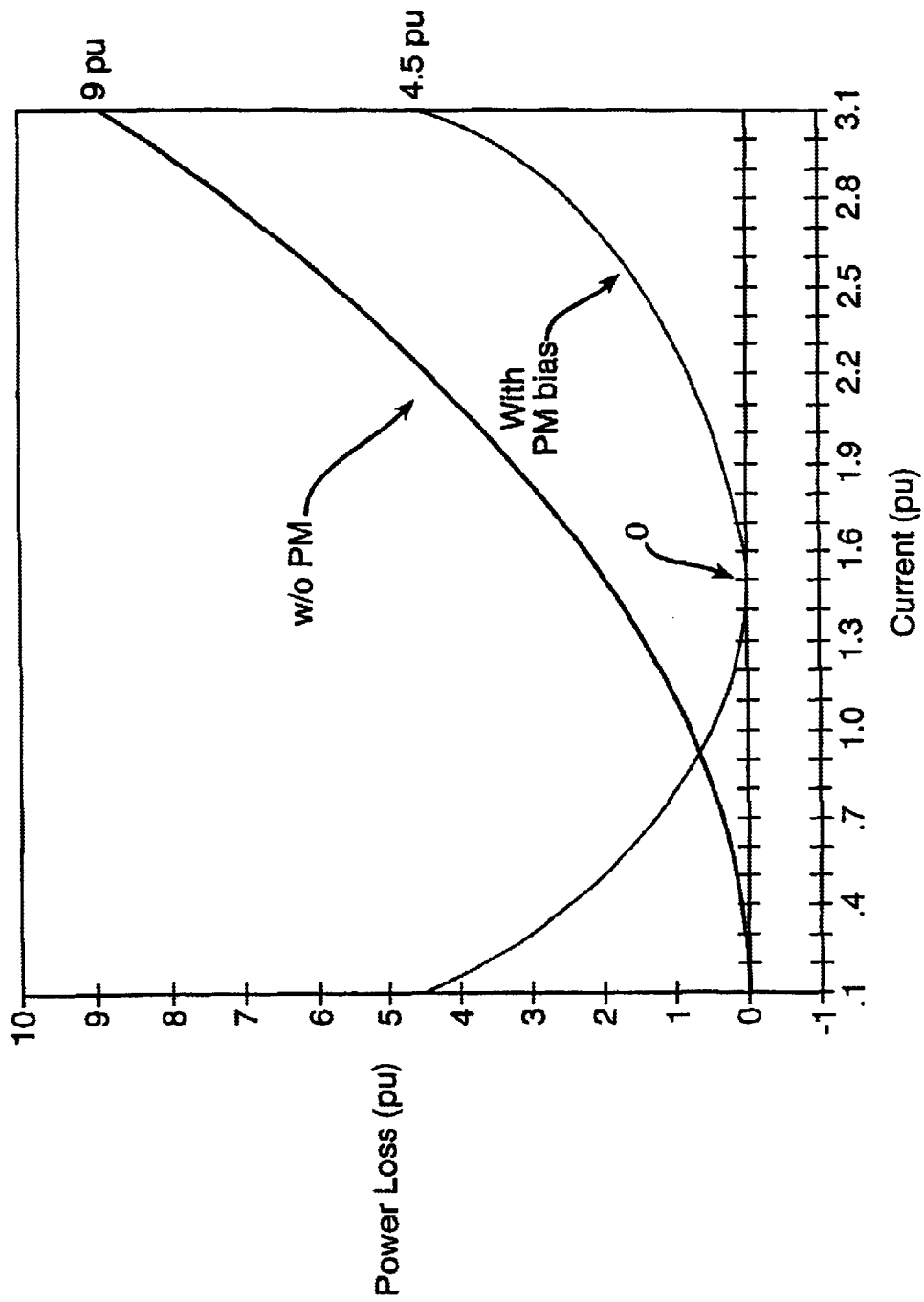
FIG. 2 is a graph of excitation winding power loss versus excitation current illustrating expected improved characteristics of the present invention as compared with conventional wound field machines.

FIG. 1 is a sectional view of a hybrid synchronous machine according to one embodiment of the present invention, FIG. 2 is a graph of excitation winding power loss versus excitation current illustrating expected improved characteristics of the present invention as compared with conventional wound field machines, and FIGS. 3–6 are sectional views of a rotors for hybrid synchronous machines according to other embodiments of the present invention.

In the embodiments of FIGS. 1 and 3–6, a hybrid synchronous machine 10 comprises a cylindrical element having slots; excitation windings situated in at least some of the slots; and permanent magnets 30 situated in at least some of the slots. In an embodiment wherein the cylindrical element comprises a rotor 12, slots 20 (and optional slots 28) can be used with excitation windings 24. In an embodiment wherein the cylindrical element comprises a stator 14, slots 22 can be used with excitation windings 26. The present invention is shown with the excitation windings and permanent magnets being situated in rotor slots (of an inner rotor machine) for purposes of example only. The present invention is additionally applicable to outer rotor machines and to machines wherein excitation windings and permanent magnets are situated in stator slots.

The resulting hybrid excitation obtained by using the permanent magnet and the excitation windings provides improved excitation control as compared with conventional permanent magnet machines and higher operational efficiency as compared with conventional wound field machines. The permanent magnets and the excitation winding can be installed in any of a number of different configurations depending on machine specifications. Additionally, although FIGS. 1 and 3–6 illustrate embodiments wherein the cylindrical elements comprise rotors for purposes of example, the cylindrical element may alternatively comprise a stator. The north (N) and south (S) polarities in the figures are for purposes of example only.

With respect to the embodiment of FIG. 1, the slots include winding slots 20 and magnet slots 28. Each permanent magnet can be situated in a respective individual one of the magnet slots as shown by permanent magnet 30 or a plurality of permanent magnets can situated in a respective one of the magnet slots as shown by permanent magnets 130. Although a two pole machine is shown for purposes of simplicity, the present invention additionally extends to machines having more than two poles.

In one embodiment, stator 14 comprises magnetic steel laminations, rotor 12 comprises a solid forging of high strength magnetic steel, permanent magnets 30 or 130 comprise neodymium-iron-boron or samarium-cobalt, for example, and the windings comprise insulated copper conductors. The depth and width of the slots for the windings and/or permanent magnets will vary according to motor design constraints.

Typically the permanent magnets will extend along the entire or a substantial portion of the length of the rotor. An advantage to having the permanent magnets extend to a portion of the rotor that does not extend to the entire length is that magnet flux is directed straight from the rotor to the stator and does not extend along the fringes in the same manner that occurs with rotor end windings. Thus the two-dimensional flux from the rotor to the stator can be increased and the fringe end flux can be decreased. Another alternative for controlling end region fields is to use magnets at the ends of the rotor (that is, magnets in the vicinity of the end windings) that are weaker than magnets along the majority of the rotor length.

The permanent magnets in FIG. 1 are situated on the pole or the direct axis of machine 10. In one embodiment, the permanent magnets are attached to the rotor core with an adhesive such as an epoxy and the windings are applied using a conventional winding technique. Then the rotor is wrapped with a metallic or non-metallic non-magnetic shell 13 which may comprise carbon, for example. In one embodiment, a non-magnetic shell is applied in a carbon fiber-epoxy composite form. One example of a technique for applying a laminated composite shell is described in commonly assigned Laskaris et al., U.S. application Ser. No. 09/196,423, filed Nov. 18, 1998 wherein a uniform stiffness composite shell assembly has a sequence of composite shells with different laminates having different stacking sequences and a graphite-epoxy material provides enhanced thermal insulating and efficient load distributing properties. In another embodiment (such as shown by the combination of shell 513 and shield 515 in FIGS. 7–8), non-magnetic shell 13 may comprise several layers having separate properties. For example, an inner layer (that is, a layer closer to the windings and magnets) may comprise a non-magnetic electrical conductor (such as aluminum, copper, or stainless steel) suitable for shielding and an outer layer (that is, a layer farther from the windings and magnets) may comprise the fiber-epoxy composite.

The graph of FIG. 2 illustrates expected improved characteristics of the embodiment of FIG. 1 as compared with conventional wound field machines. The graph is based on the first assumption that for a wound field machine, to maintain constant voltage, the excitation varies from 1.0 pu (per unit) current under no load conditions to 3.0 pu current under full load conditions. Therefore, assuming a constant temperature, the excitation power for such wound field machine varies from 1.0 pu to 9.0 pu. If a hybrid machine is designed such that the permanent magnets supply the equivalent of 1.5 pu excitation MMF, the excitation power will be 4.5 assuming that the same current density is maintained and that one half of the original winding is removed to make room for the permanent magnets. A bi-directional excitation source (not shown) can be used to add or subtract from the permanent magnet field.

In conventional permanent magnet machines, stator winding faults can be a significant problem. When a machine is run in a system in which speed cannot be reduced quickly, a stator fault will be driven by the full machine flux because the magnetic field cannot be turned off. In the embodiments of the present invention, the flux can quickly be reduced to zero via the excitation winding when a stator fault is detected.

Figure 3:
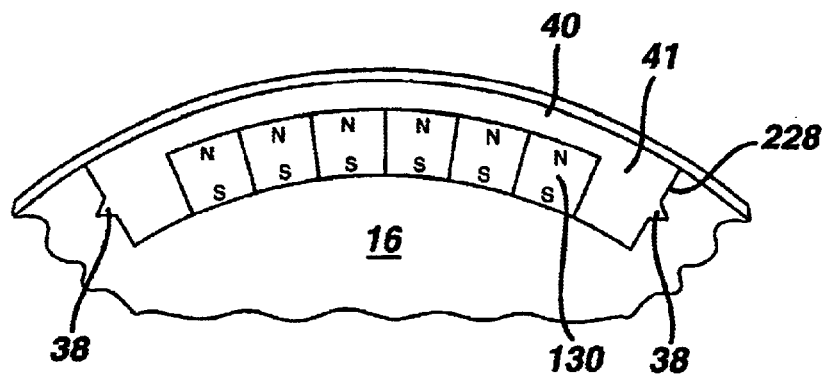
FIGS. 3–6 are sectional views of rotors for hybrid synchronous machines according to other embodiments of the present invention.

FIG. 3 is a sectional view of a hybrid synchronous machine according to another embodiment of the present invention. In the embodiment of FIG. 3, the machine further includes shielding material 40 in each slot 228. The shielding material surrounds at least portions of the permanent magnets 130 and further secures the permanent magnets. Shielding material 40 may comprise aluminum, copper, or stainless steel for example, and is useful for shielding the permanent magnets from demagnetizing fields of the stator during normal operating conditions and during high current transient conditions. To minimize leakage of magnetic flux back to the rotor body, extra shielding material 41 can be positioned between at least one permanent magnet 130 and sides of magnet slot 228.

Shielding material 40 may further be used to retain the magnets against centrifugal forces. In one embodiment, to aid in retention, the magnet slots include magnet slot notches 38 and the shielding material extends into the magnet slot notches.

Figure 4:
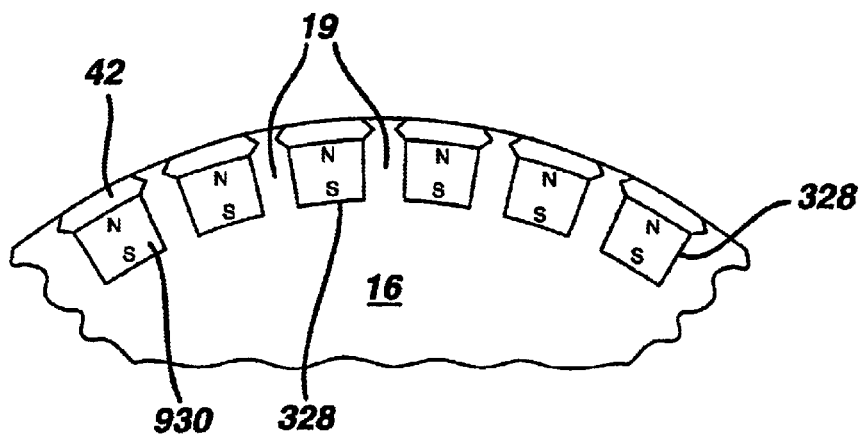

FIG. 4 is a sectional view of a hybrid synchronous machine according to another embodiment of the present invention. Depending on the dimensions of magnets in FIG. 3, the magnets may be difficult to securely retain. In the embodiment of FIG. 4, magnets are inserted into individual magnet slots 328. In order to minimize magnet leakage, teeth 19 between magnet slots 328 are designed to be as narrow as practical. After insertion of permanent magnets 930, wedge material 42 is situated in each magnet slot 328 between a respective permanent magnet 930 and a perimeter of the rotor for shielding and securing the permanent magnet. Wedge material 42 may comprise aluminum, copper, or stainless steel, for example. To compensate for the fact that some of the magnet volume and/or energy will be diverted to saturate teeth 19, higher energy grade magnets can be used.

Figure 5:
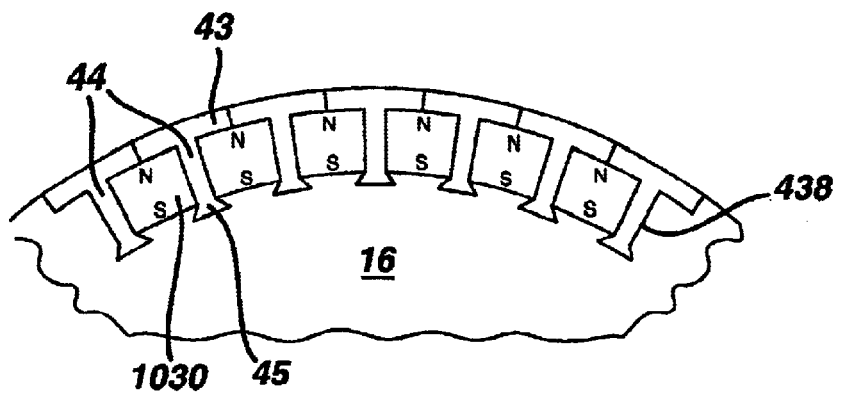

FIG. 5 is a sectional view of a hybrid synchronous machine according to another embodiment of the present invention. The embodiment of FIG. 5 can be used to reduce leakage by situating retainer segments 44 between adjacent permanent magnets 1030 rather than having the teeth 19 of FIG. 4. The retainer segments may include aluminum, copper, or stainless steel for example. A useful shape of the retainer segments is the shape of a single or multiple dove-tailed T with the outer portions 43 of the retainer segments supporting the permanent magnets and inner portions 45 of the retainer segments forming dove tails to interlock with rotor core 16.

In each of the embodiments of FIGS. 3–5, the shielding material, wedge material, and retainer segments are useful for mechanically stabilizing the permanent magnets, for protecting them from environmental and thermal damage, and for electromagnetically shielding the permanent magnets and the rotor core from potentially destructive, non-synchronous frequency fields of line starting transients, power line transients, inverter harmonics, and winding and slot harmonics, for example.

Figure 6:
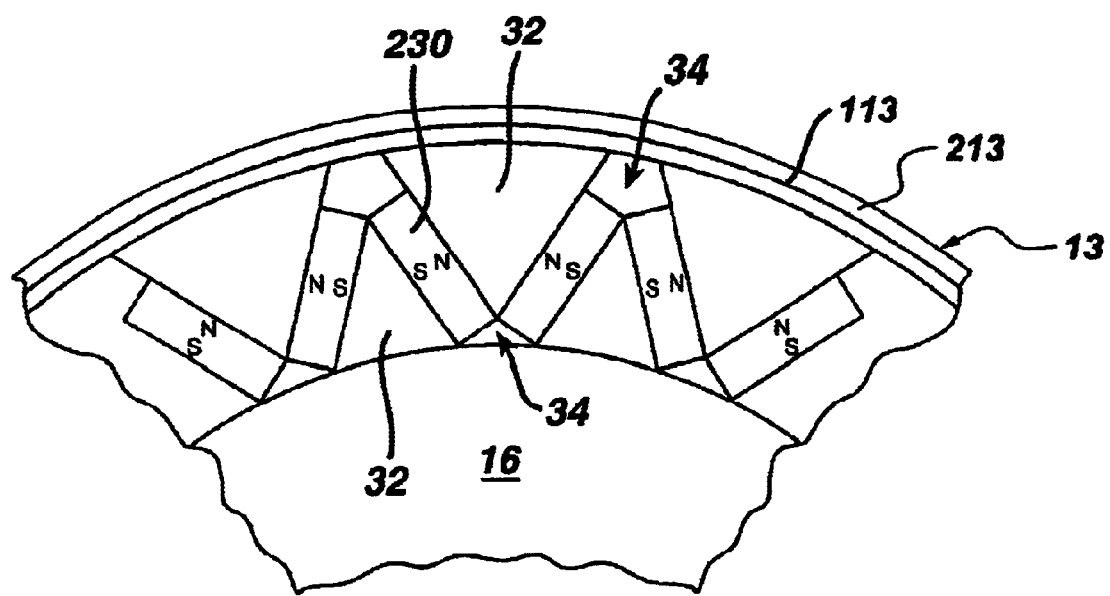

If a higher flux level is desired than can be achieved by inserting the magnets in the above configurations, the embodiment of FIG. 6 can be useful. In the embodiment of FIG. 6, permanent magnets 230 are situated in a flux focusing pattern by alternating the permanent magnets with sub-pole wedges 32 positioned between permanent magnets. For another example of permanent magnets in a diagonal orientation, see commonly assigned Kliman, U.S. Pat. No. 5,159,220. The sub-pole wedges may comprise a structurally appropriate magnetic material such as, for example, steel. In the embodiment of FIG. 6, the sub-pole wedges have triangular shapes with two sides of each triangle facing permanent magnet portions having a common polarity. A number of sub-pole wedges and permanent magnets will form a single pole of the machine. Non-magnetic filler material 34 may be used for securing the magnets and the sub-pole wedges. The non-magnetic filler material may comprise non-magnetic metallic or non-metallic materials.

Figure 7:
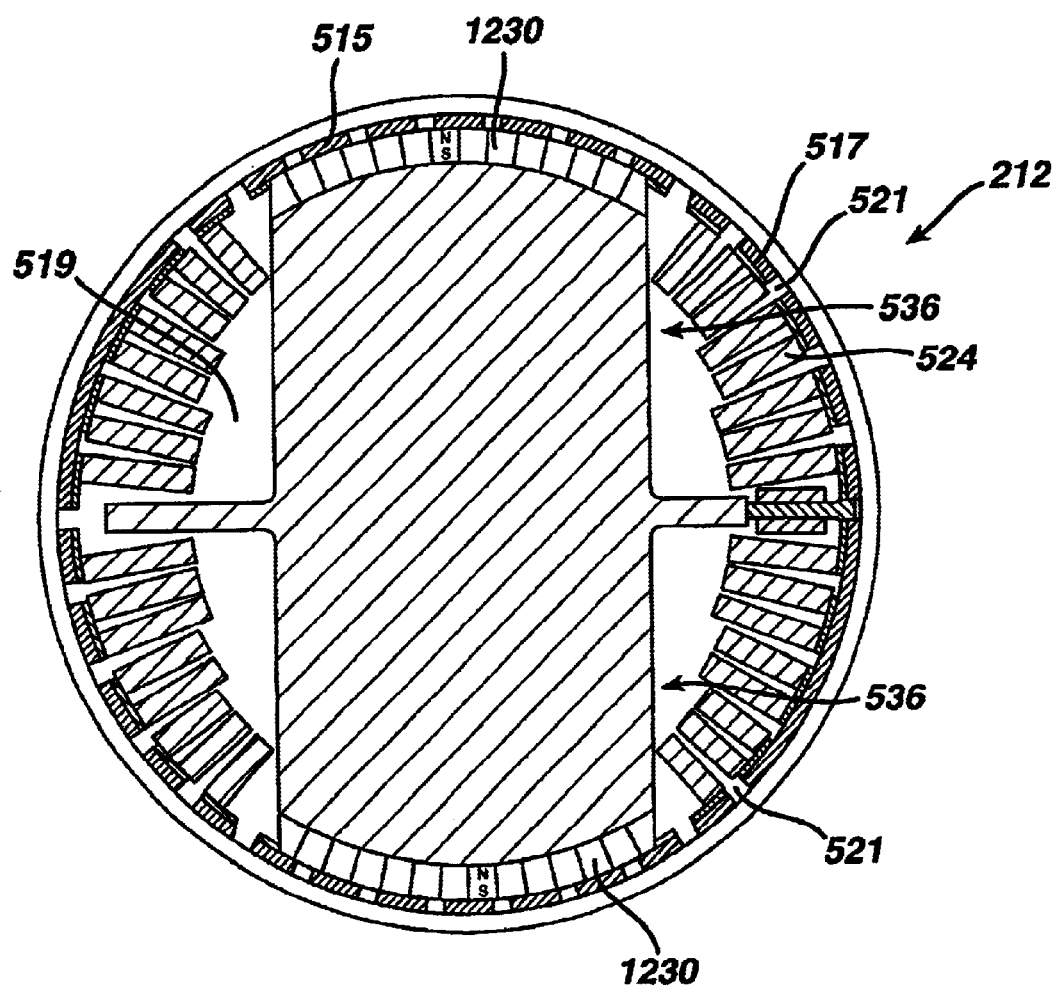
FIGS. 7–8 are sectional views of rotors showing salient poles of a hybrid salient pole machine according to several embodiments of the present invention.
Figure 8:
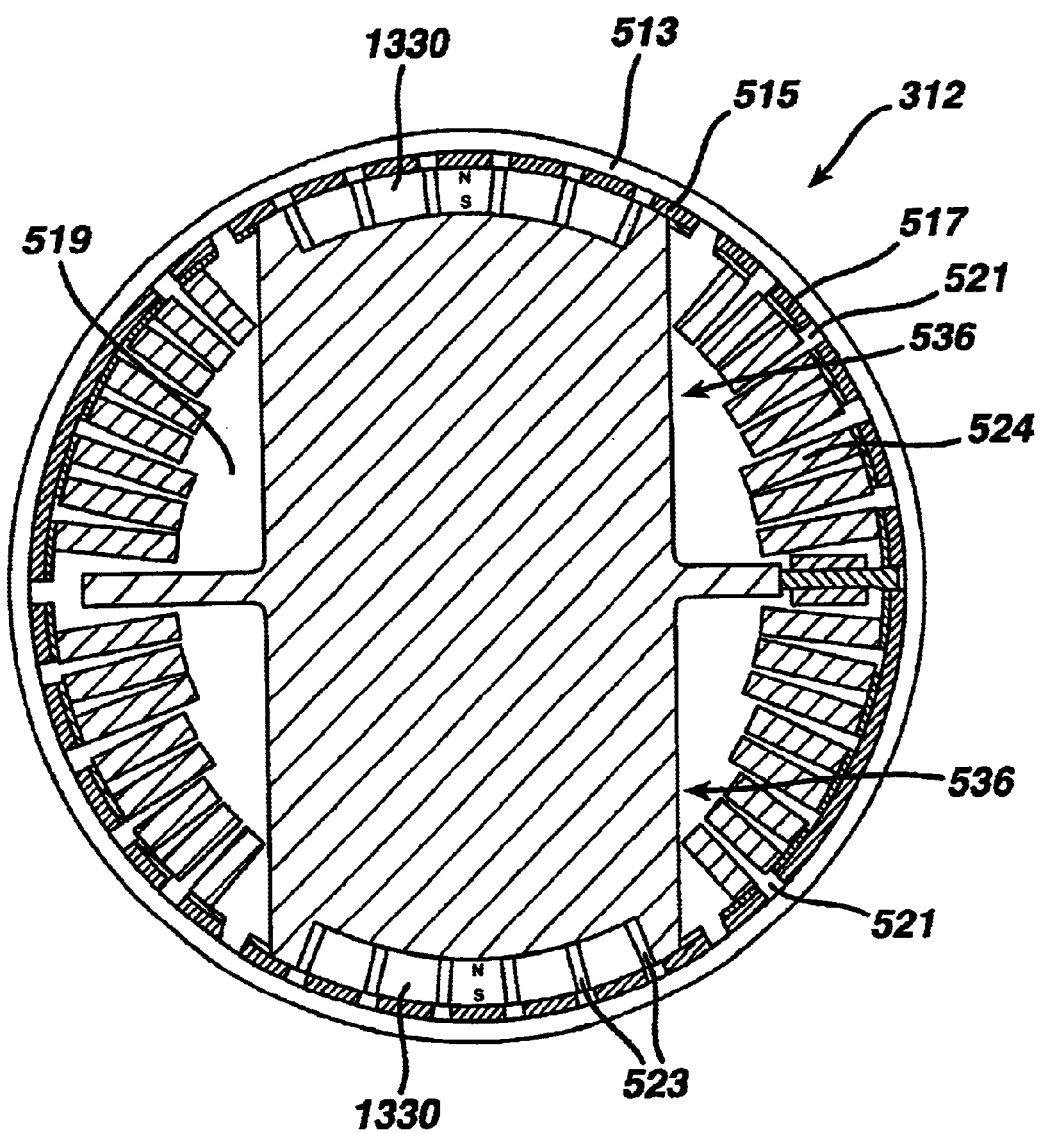
Figure 11:
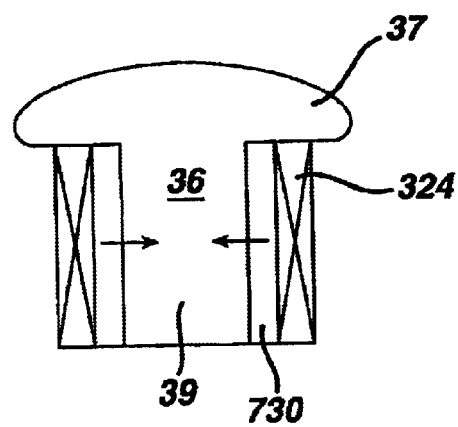
Figure 12:
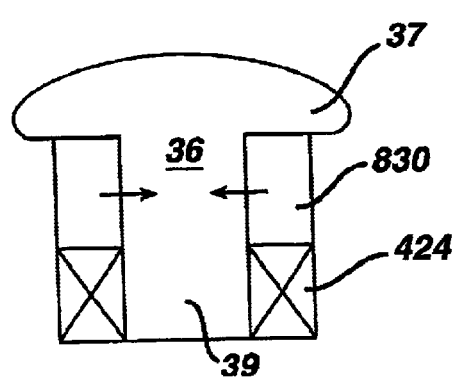
Figure 13:
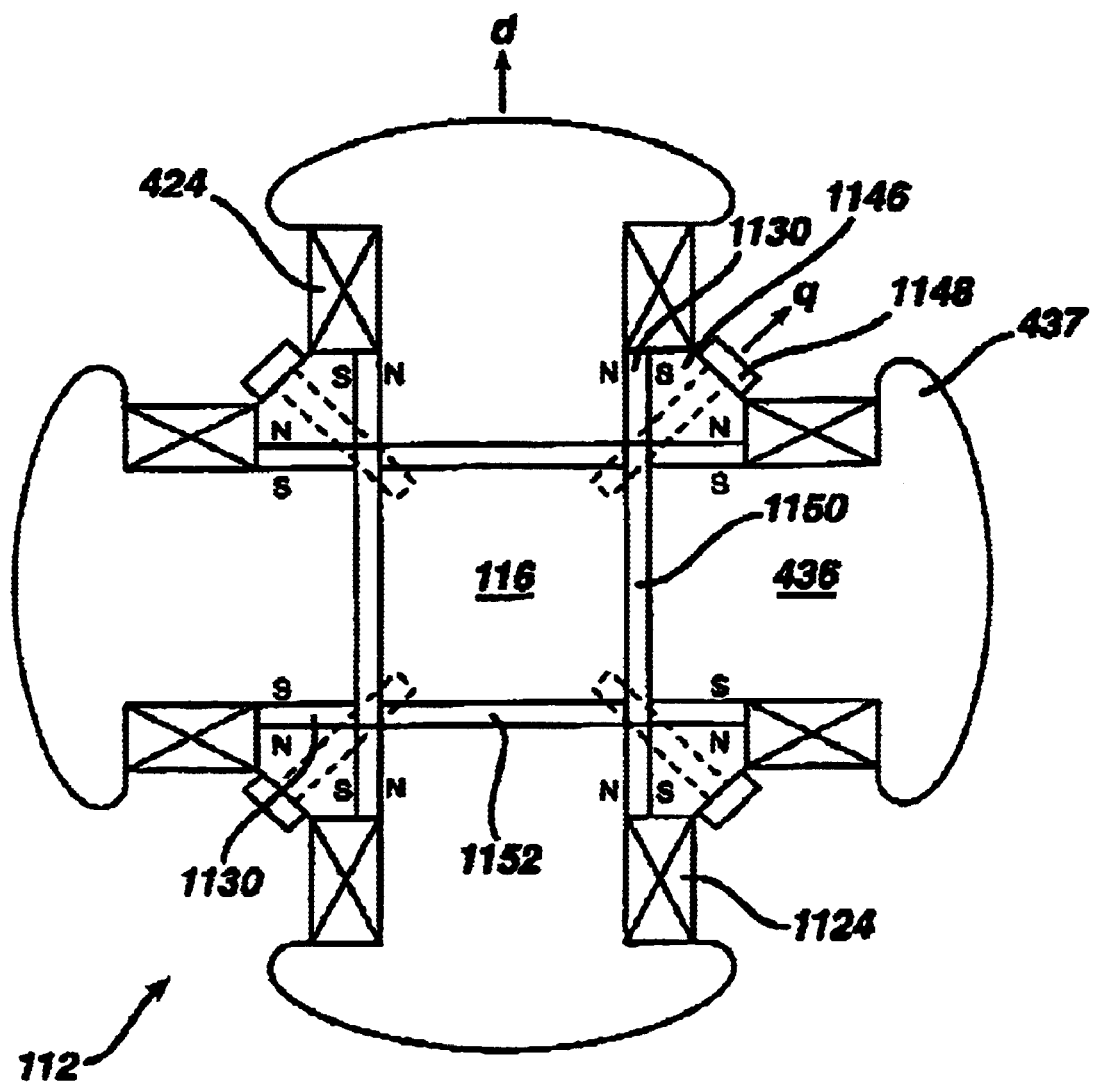
FIG. 13 is a sectional view of a rotor of a hybrid salient pole machine according to another embodiment of the present invention.

FIGS. 7–8 are sectional views of rotors showing salient poles of a hybrid salient pole machine according to several embodiments of the present invention,, FIGS. 9–12 are sectional views of salient poles of hybrid salient pole machines according to other embodiments of the present invention, and FIG. 13 is a sectional view of a rotor of a hybrid salient pole machine according to another embodiment of the present invention. In the embodiments of FIGS. 7–13, a hybrid salient pole machine includes a "cylindrical" element (shown as a salient pole rotor 212 in FIG. 7, 312 in FIG. 8 and 112 in FIG. 13 for purposes of example—the cylindrical element could alternatively comprise a salient pole stator) having salient poles 36 or 536; excitation windings 224 or 524 situated around the salient poles; and permanent magnets 530, 630, 730, 830, 1130, 1230, or 1330 supported by the salient poles. The excitation windings can be situated around the poles so as to touch the poles as shown in FIGS. 9–13 or so as to be separated from the poles by support elements 519 as shown in FIGS. 7–8. "Supported by" is meant to include permanent magnets being situated within or around salient pole faces or bodies. The stator, rotor, magnet, and winding materials may comprise materials such as those discussed with respect to FIGS. 1 and 3–6, for example.

Any of the embodiments discussed with respect to FIGS. 1 and 3–6 can be adapted for use in salient pole machines. In the embodiment of FIG. 7, for example, non-magnetic shell 513 similar to the shell 13 that was discussed with respect to FIG. 1 is applied around salient poles 536 and rotor excitation windings 524, and permanent magnets 1230 are arranged in a similar configuration to that of FIG. 1. The embodiment of FIG. 8 is similar to that of FIG. 7 with permanent magnets 1330 being spaced apart from one another by spacers 523 which may comprise teeth of the pole faces or may comprise non-magnetic metallic or non-metallic retainer segments that are inserted between permanent magnets.

A shield 515 can be positioned between the excitation windings and shell 513. In one embodiment, the shield comprises aluminum. Additionally, an insulation layer 517 comprising a non-metallic plastic, for example, can be positioned between the excitation windings and shield 515. Holes 521 can extend through the shield and the insulation layer for cooling purposes. Non-conductive support elements 519 can be disposed at selected locations along the length of the rotor to support excitation windings 524.

Rotors of the type shown in FIGS. 7–8 are particularly useful in wound field generator embodiments. Excitation losses can be reduced by packing more copper in the salient poles of the rotors as compared with conventional wound field generator rotors. Using the permanent magnets further reduces the excitation losses for the reasons discussed above.

Figure 9:
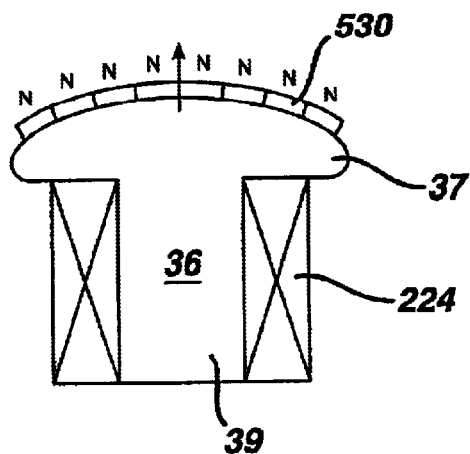
FIGS. 9–12 are sectional views of salient poles of hybrid salient pole machines according to other embodiments of the present invention.

In the example of FIG. 9 permanent magnets 530 are attached to pole faces 37 and excitation windings 224 are wrapped around pole bodies 39. Although FIG. 9 resembles the embodiment of FIG. 1, any of the slot and/or spacing features of FIGS. 3–6 could alternatively be used.

Figure 10:
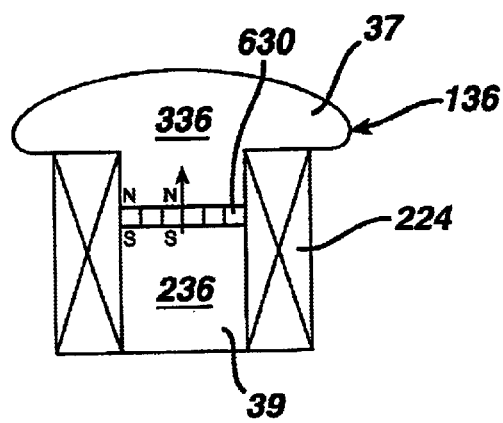

In the embodiment of FIG. 10, permanent magnets 630 are situated within pole bodies 39. In one example, the magnets are in the shape of rectangular blocks around the perimeter. Alternatively, the magnets can have trapezoidal or other shapes and/or the magnets can have wedges situated therebetween for a similar flux focusing arrangement as described above with respect to FIG. 6 and/or to provide additional structural strength.

In the embodiments of FIGS. 11–12, permanent magnets 730 or 830 are attached to pole bodies 39. In the embodiment of FIG. 11, the excitation windings 324 surround the permanent magnets 730 whereas in the embodiment of FIG. 12, excitation windings 424 are situated adjacent to the permanent magnets 830 on different lateral section of the pole bodies. The positions of permanent magnets and excitation windings in FIGS. 11 and 12 are for purposes of example and can be interchanged or interspersed.

FIG. 13 illustrates additional embodiments for integrating magnets into a salient pole rotor. A four pole rotor is shown for purposes of example only. In the embodiment of FIG. 13, the excitation windings 1124 are situated adjacent to the permanent magnets 1130 on different lateral sections of the pole bodies with the excitation windings being situated closer to faces 437 of the salient poles than the permanent magnets. Magnetic retainers 1146 can be used for retaining the permanent magnets in position on the rotor, and a fastener such as shown by bolts 1148 can further provide structural support. A further benefit of the magnetic retainers is that the magnetic retainers can be used to carry flux from pole to pole.

If rotor core 116 is non-magnetic, then most of the magnet flux will be directed to the stator and the airgap between the rotor and the stator. If rotor core 116 is magnetic, it is useful to further include non-magnetic plates 1150 and 1152 within the core for directing magnetic flux which can be attached using a weld or another attachment technique such as keying. Keying can also be used to couple the salient poles to the plates and/or to the rotor core Although non-magnetic plates are shown for purposes of example, such plates need not be present in an embodiment wherein a rotor core is non-magnetic.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A hybrid salient pole machine comprising:
   a cylindrical element having salient poles;
   excitation windings situated around the salient poles;
   permanent magnets supported by the salient poles; and
   a non-magnetic shell surrounding the permanent magnets and the excitation windings; and
   a shield between the non-magnetic-shell and the permanent magnets and the excitation winding.

2. The machine of claim 1 wherein the excitation windings are separated from the salient poles by support elements.

* * * * *